July 29, 1930.  C. W. CRAIG  1,771,954
METHOD AND APPARATUS FOR BLOWING BULBS
Filed March 25, 1927
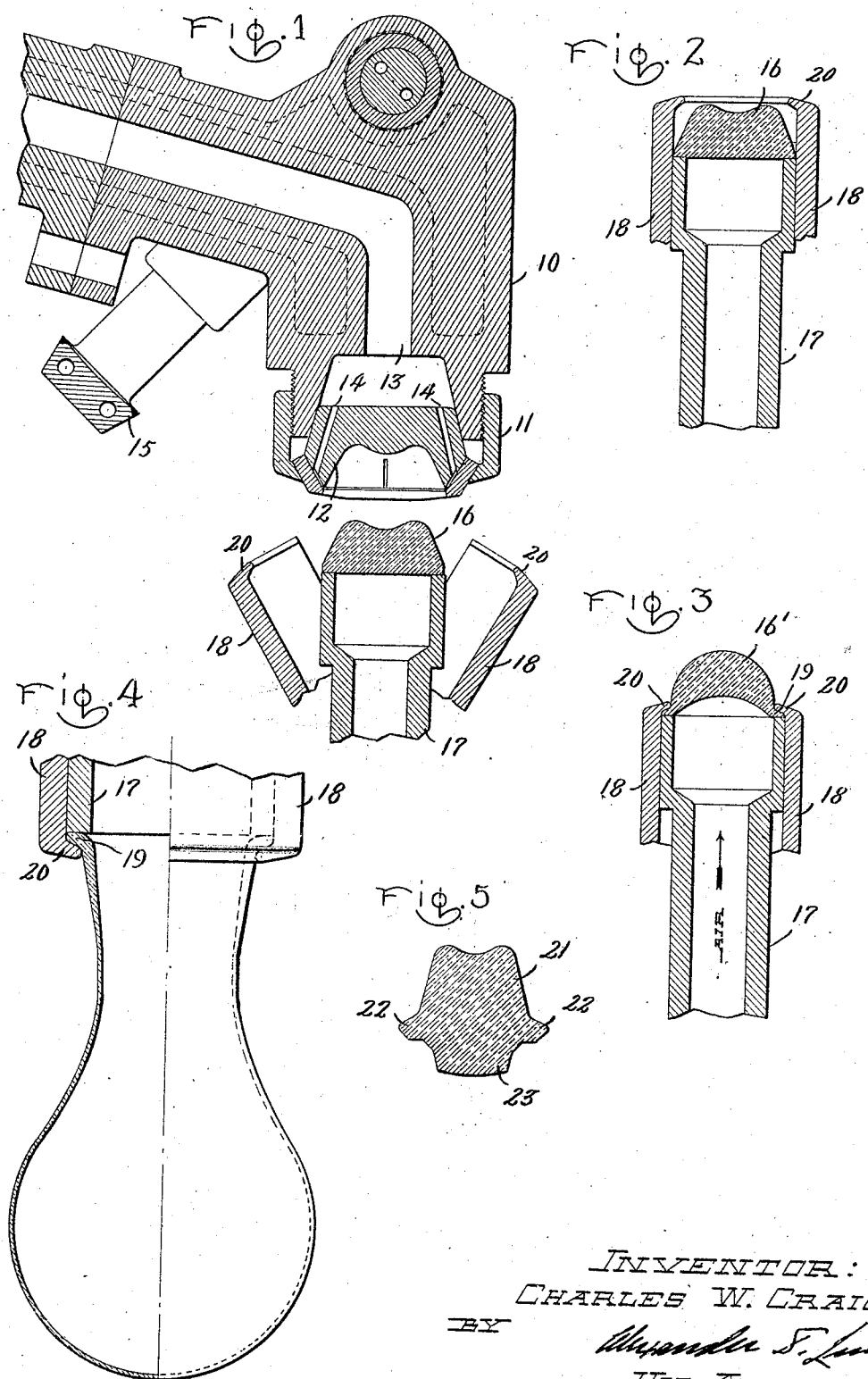
INVENTOR:
CHARLES W. CRAIG,
BY
HIS ATTORNEY.

Patented July 29, 1930

1,771,954

UNITED STATES PATENT OFFICE

CHARLES W. CRAIG, OF EAST CLEVELAND, OHIO, ASSIGNOR TO GENERAL ELECTRIC COMPANY, A CORPORATION OF NEW YORK

METHOD AND APPARATUS FOR BLOWING BULBS

Application filed March 25, 1927. Serial No. 178,437.

My invention relates to methods and apparatus for blowing bulbs suitable for incandescent electric lamps and similar articles, and more particularly to such methods and apparatus involving the suction method of gathering molten glass as disclosed in Kadow Patent No. 1,021,048, issued March 26, 1912.

It has been the practice to gather a blank from the molten glass, which is usually contained in a tank, by a gathering head comprising an apertured mold into which the molten glass is drawn by suction and to thereafter cut off the blank by suitable knives attached to the mold. The shape of the blank has been as shown in the Kadow patent above referred to, that is, with an intermediate flange extending therearound. The practice has been to drop said blank from the gathering mold to the blowing spindle, the end of which carries a gripping device which clamps the flange and one end portion of the blank to the upper end of the blowing spindle. As disclosed in the Kadow patent above referred to, the next step is to drive a plunger contained in the blowing spindle into the soft blank to form an initial air chamber, the plunger afterwards being withdrawn. Subsequently the spindle is turned to bring the blank into lowermost position and the bulb is then blown.

The bulb produced by the above described method has a moil portion of thick glass having an opening therethrough of comparatively small diameter. It is necessary to remove this moil before the filament mount of the lamp or similar device can be inserted in the bulb and sealed thereto. This requires a separate operation in lamp making and adds to the cost of manufacture.

According to the method comprised by my invention, the shape of the blank is changed from that above described to eliminate the constricted end portion, and the blank is clamped and sealed to the blowing spindle simply by engagement with an end flange as distinguished from an intermediate flange as no preliminary air chamber is necessary and the plunger which has been used for its formation is dispensed with. The bulb produced after the blowing operation has an end neck ring of thickened glass, but the opening therethrough is not constricted but is of such diameter as to allow the passage of the filament mount for sealing in without necessitating a separate moil cutting off operation. While a bulb of this general construction is disclosed in Branin Patent No. 1,315,813 issued September 9, 1919, that bulb was not actually produced by the suction gathering method with which my invention has to do, but by a press and blow method. One advantage of my invention is the saving in cost of manufacture. Further features and advantages of my invention will appear from the description of a species thereof which follows.

In the drawing, Fig. 1 is a vertical section of the suction mold and of a gathering head with the registering end of a blowing spindle both made according to my invention; Fig. 2 is a vertical section of the end portion of the blowing spindle with the parts in intermediate position; Fig. 3 is a similar view with the parts in final position; Fig. 4 is a similar view showing the blown bulb; and Fig. 5 is a vertical section of the old style blank.

The apparatus shown in Fig. 1 comprises the head 10 in the end of which is detachably secured by the partially internally threaded ring 11 the blank mold 12 into which molten glass is drawn during the gathering operation by suction applied through the passage 13 in head 10 acting through apertures 14 in the mold 12. The said mold has no laterally re-entrant portions such as formed by neck mold sections of such molds as heretofore constructed and no intermediate flange is formed, therefore, on the blank. The usual pivoted knife 15 is provided for shearing off the blank after the mold is filled. The blank 16 is shown as it is dropped upon the end of the blowing spindle 17 which has the usual pivoted clamp portions 18 which are mounted for vertical downward movement after closing. In Fig. 2 the blank 16 is shown resting on the end of the blowing spindle 17 with the clamp portions 18 closed but elevated. In Fig. 3 the clamp portions 18 are shown in final clamping position compressing a circumferential external flange 19 at the end of the blank between the internal flange 20 of the clamp portions and the top of the blowing spindle. The blank 16' is shown slightly altered in shape as the blowing operation has started.

The shape of the blank 16 produced by my invention is to be contrasted with that of blank 21 of the character heretofore produced. The latter has the intermediate flange 22 and the constricted end portion 23 which results in a moil having a constricted opening insufficient to allow the passage of the filament mount during the manufacture of the lamp or similar device and requiring a separate operation for its removal. On the other hand the blank 16 as produced by my invention has no constricted end portion and the clamping thereof in the blowing spindle produces an end flange by means of which alone the blank is held, thus allowing the formation of a neck opening in the bulb large enough to take the mount without requiring the removal of a moil.

What I claim as new and desire to secure by Letters Patent of the United States, is:—

1. The method of making a bulb for an incandescent lamp or similar article which consists in drawing molten glass by suction into a mold to form a blank, dropping said blank upon a blowing spindle and supporting it by clamping the lower edge thereof to the top of said spindle.

2. The method of making a bulb for an incandescent lamp or similar article which consists in drawing molten glass by suction into a mold free of laterally re-entrant portions to form a blank, dropping said blank upon a blowing spindle and supporting it by clamping the lower edge thereof to the top of said spindle.

3. The method of making a bulb for incandescent electric lamps and similar articles which consists in gathering by suction from a supply of molten glass a blank having its bottom diameter at least as great as that of any other diameter thereof, clamping the lower edge of said blank to a blowing spindle and then blowing said article.

4. The method of making a bulb for incandescent electric lamps and similar articles which consists in gathering by suction from a supply of molten glass a blank having its bottom diameter at least as great as that of any other diameter thereof, clamping the lower edge of said blank to a blowing spindle and then blowing said article without any further preliminary forming of said blank.

5. In a bulb blowing machine, the combination of a suction gathering head and a hollow blowing spindle adapted to receive a blank dropped from said head, said head comprising a mold having a lower opening greater in diameter than the upper end opening in said spindle and said spindle comprising means for clamping said blank over said end opening.

In witness whereof, I have hereunto set my hand this 22nd day of March, 1927.

CHARLES W. CRAIG.